United States Patent [19]

Shintani

[11] Patent Number: 5,452,008
[45] Date of Patent: Sep. 19, 1995

[54] BROADCAST RECEIVING SYSTEM
[75] Inventor: Peter Shintani, Tokyo, Japan
[73] Assignee: Sony Corporation, Tokyo, Japan
[21] Appl. No.: 255,239
[22] Filed: Jun. 7, 1994
[30] Foreign Application Priority Data Jun. 7, 1993 [JP] Japan .................. 5-135653

[51] Int. Cl.⁶ .............................................. H04N 5/445
[52] U.S. Cl. ..................................... 348/468; 348/564
[58] Field of Search ............... 348/468, 553, 563, 564, 348/228, 231; 380/10; H04N 5/445

[56] References Cited

U.S. PATENT DOCUMENTS

| | | | |
|---|---|---|---|
| 4,337,483 | 6/1982 | Guillou | 348/468 X |
| 4,688,218 | 8/1987 | Blineau et al. | 348/468 |
| 4,849,818 | 7/1989 | Hartmann et al. | 348/468 |
| 5,260,778 | 11/1993 | Kauffman et al. | 348/468 X |
| 5,299,006 | 3/1994 | Kim | 348/725 X |

Primary Examiner—Victor R. Kostak
Attorney, Agent, or Firm—Limbach & Limbach

[57] ABSTRACT

A television signal receiving apparatus for a conventional television receiver capable of receiving a non-scrambled video signal and a related character signal inserted in a vertical blanking interval of the non-scrambled video signal comprises a tuner, a decoder, a video processor, a character generator, a controller, an input terminal and a scrambled signal decoder. The character generator 56 is set up at the television 2 and control signals for controlling this character generator 56 are inputted from the decoder 1. It is therefore not necessary to have a character generator on the side of the decoder 1 so that the construction of the system can be less complicated and the cost of the system can be reduced.

8 Claims, 2 Drawing Sheets

BROADCAST RECEIVING SYSTEM

BACKGROUND OF THE INVENTION

1. Field of the Invention

The present invention relates to a broadcast receiving system to be used when a television broadcast to be received includes character information.

2. Description Of The Related Art

FIG. 2 is a block diagram showing the structure of a prior art broadcast receiving system. This system is made up of a decoder 1 and a television (TV) 2. This TV 2 has a built-in tuner 50 which demodulates an RF receiving signal from the electromagnetic wave broadcast inputted at the input terminal 53 and outputs this to the video processor 51. The demodulated video signal sent from the tuner 50 is then processed by the video processor 51, outputted to the CRT 52 and displayed.

When usual television broadcasts are to be received, the system is just made up of the TV 2. The decoder 1 is connected to the television TV 2, however, in the event of watching a program, for example, on a prescribed scrambled cable television channel.

The decoder 1 also has a built-in tuner 11. This tuner demodulates the transmitted RF signal which has come via cable and outputs the demodulated video signal (detecting signal or intermediate frequency signal(IF signal)) to the descramble circuit 12.

The output from the tuner 11 is also sent to the data extraction circuit 14. The data extraction circuit 14 extracts the key signals necessary for descrambling the scramble signal from the inputted signal and outputs them to the controller 15. The controller 15 then outputs the data corresponding to the inputted key signals to the descramble circuit 12. The scrambled video signal provided by the tuner 11 in accordance with the key signal provided by the controller 15 is then descrambled by the descramble circuit 12.

The descrambled video signal from the descramble circuit 12 is sent to the input terminal 31 of the TV 2 via the multiplexer 13, the output terminal 19 and the cord 21, from where it is inputted to the video processor 51. This inputted video signal is then processed by the video processor 51 and outputted to the CRT 52. In this way, the scrambled video image which was broadcasted can be displayed on the CRT 52 in its unscrambled form.

The decoder 1 also has a circuit set up for displaying predetermined messages (menus) for the viewers (subscribers). This message information is usually transmitted on prescribed cable television channels. i.e. the controller 15 controls the tuner 11 so as to receive electromagnetic waves for a prescribed channel. The data extraction circuit 14 then extracts the menu information component from the signal outputted by the tuner 11 and outputs it to the controller 15. The controller 15 then controls the character generator 16 in accordance with the information provided by the data extraction circuit 14 and generates character displays for the inputted information.

This display character data is then inputted to the converter 17, converted into, for example, an NTSC video format signal and sent to the multiplexer 13. The multiplexer 13 then superimposes the video signal provided by the descramble circuit 12 with the character display provided by the converter 17. In this way, the video signal on which the character display (menu) has been superimposed can be outputted to the CRT 52 and displayed after having been inputted to and processed by the video processor 51. By doing this, for example, the viewer can select pay per view programs which necessitate special charges as required.

Also, the descramble circuit 12 is controlled by the controller 15 so that a scrambled signal inputted by the tuner 11 will be descrambled and outputted, whereas an unscrambled signal will be outputted without modification.

The decoder 1 also outputs the decoded signal as an RF signal when the television does not have a composite video signal input terminal (in cases where the television only has an RF signal input terminal). i.e. the RF modulation circuit 18 for the decoder 1 modulates the output of the multiplexer 13 and outputs this from the output terminal 20 as an RF signal. This signal is then taken as input at the RF signal input terminal 32 of the TV 2 via the cord 22. The signal inputted via the input terminal 32 is then sent to the tuner 50, demodulated in the same way as for the signal inputted via the input terminal 53, outputted to the CRT 52 and displayed.

The kind of decoder 1 in this prior art broadcast receiving system has a character generator 16 set up for outputting and displaying character information. This both complicates the construction of the system and increases its cost.

As the present invention sets out to solve the above problems, its object is to provide a broadcast receiving system of a less complicated construction at a lower cost.

SUMMARY OF THE INVENTION

According to the present invention, a television signal receiving apparatus for a conventional television receiver capable of receiving a non-scrambled video signal and a related character signal inserted in a vertical blanking interval of the non-scrambled video signal comprises a tuner, a decoder, a video processor, a character generator, a controller, an input terminal and a scrambled signal decoder. The tuner is for receiving a television signal and generating the non-scrambled video signal. The decoder is for extracting and decoding the character signal from the non-scrambled video signal. The video processor is for processing a video signal. The character generator is for generating a character video signal in response to the decoded character signal. The controller is for controlling the tuner, the character generator and the video processor means. The input terminal is for receiving an external video signal and the scrambled signal decoder, which is equipped with an encoder for encoding the descrambled signal so as to be identical to the non-scrambled video signal, is for receiving and descrambling a scrambled video signal, with the output from the encoder being supplied to the input terminal.

Also, according to the present invention, the scrambled signal decoder further includes a data extractor for extracting data for descrambling the scrambled signal.

Further, according to the present invention, the conventional television receiver and the scrambled signal decoder are capable of being operated by remote control.

In the broadcast receiving system with the above construction, the character generator is set up at the television and control signals for controlling this character generator are inputted from the decoder. It is therefore not necessary to have a character generator on the side of the decoder and it becomes possible to reduce the complexity of the construction and cost of the system.

DETAILED DESCRIPTION OF THE PREFERRED EMBODIMENT

Embodiment

Figure 1:
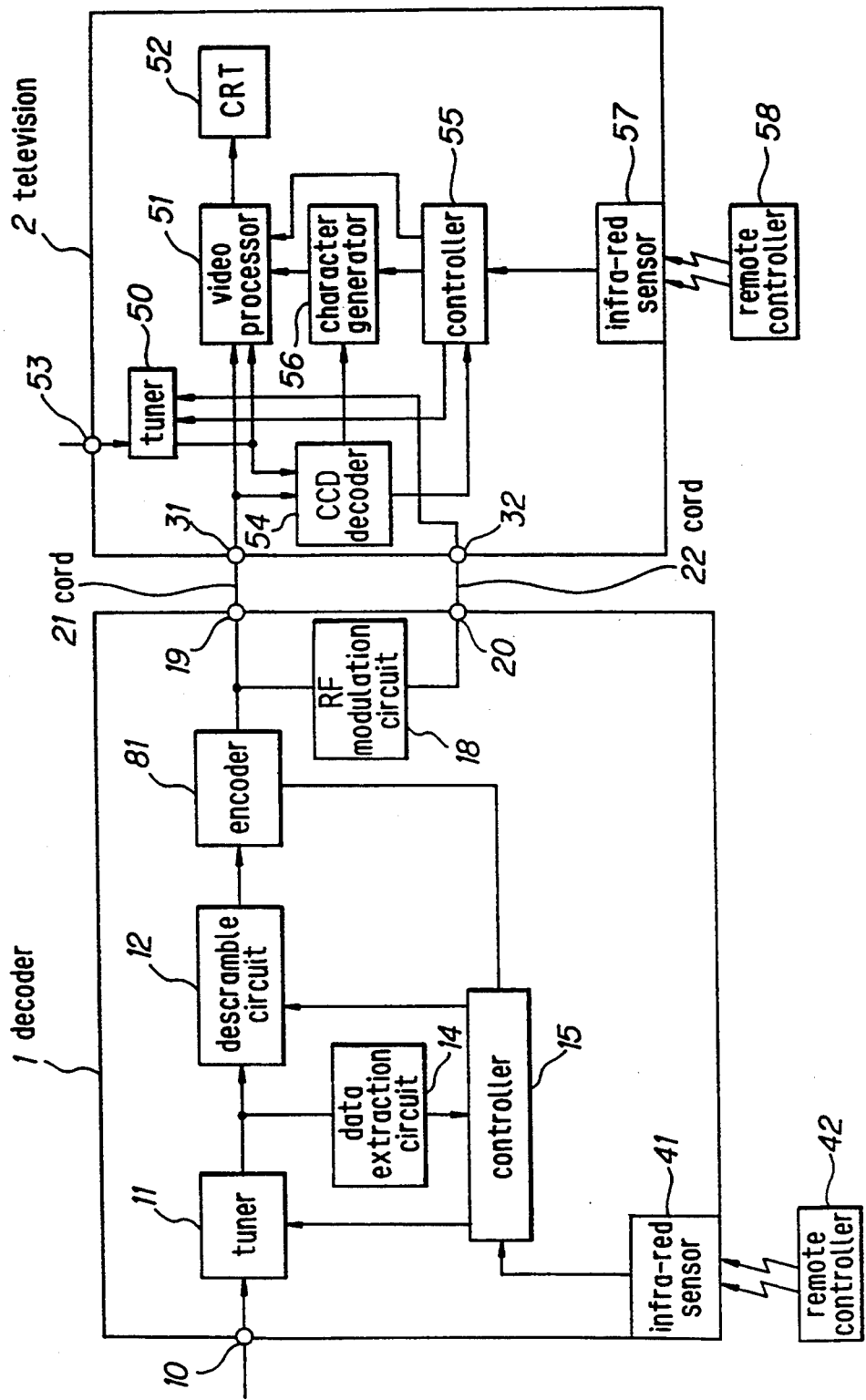
FIG. 1 is a block diagram showing the structure of an embodiment of the broadcast receiving system for this invention.

FIG. 1 is a block diagram showing the structure of a broadcast receiving system for a first embodiment of this invention. Portions which correspond to portions in FIG. 2 will be given the same numerals.

Figure 2:
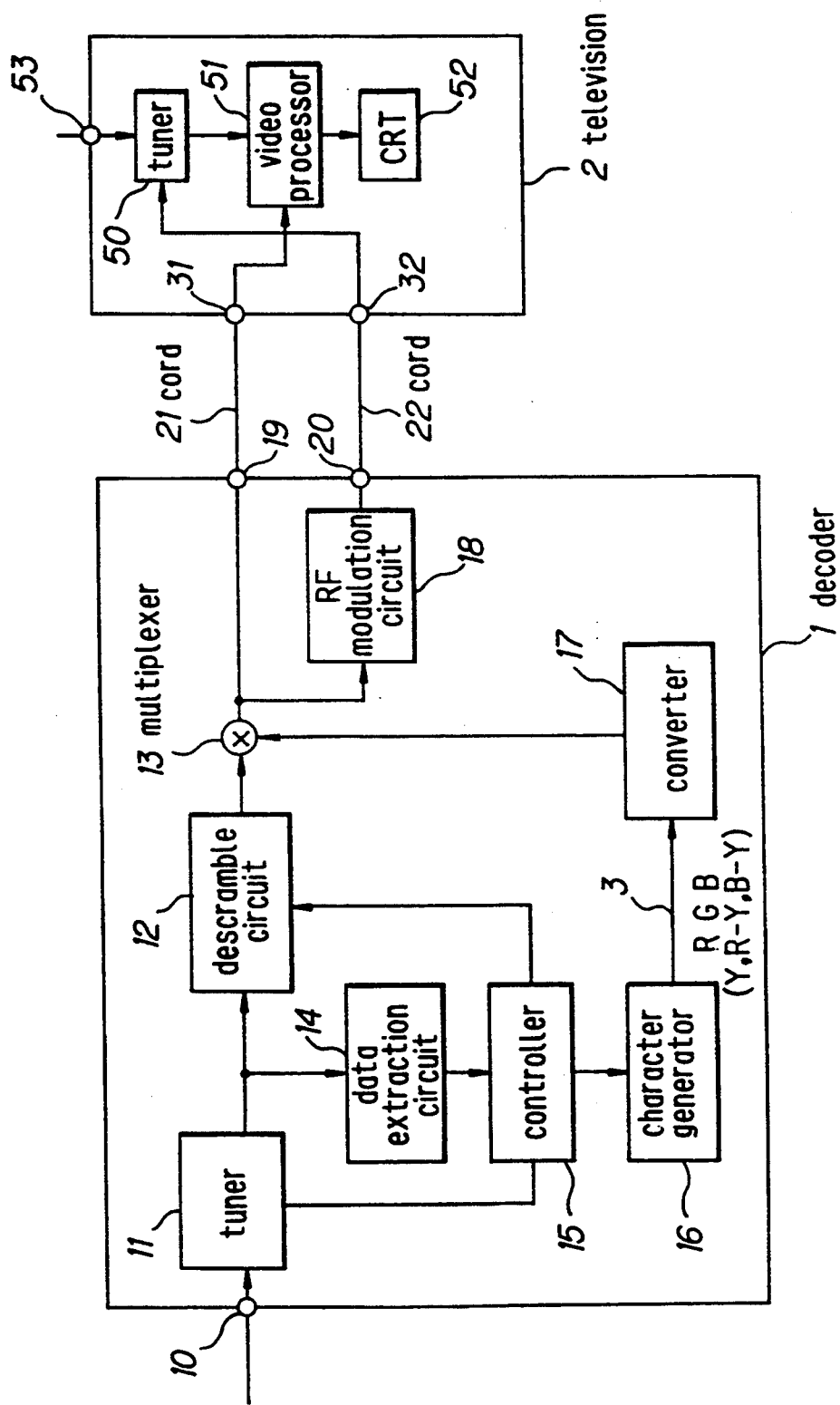
FIG. 2 is a block diagram showing the structure of a prior art broadcast receiving system.

In this embodiment, an infra-red sensor 41 for detecting an infra-red signal projected from a remote controller 42 and outputting this detected signal to a controller 15 is set up within a decoder 1. A control signal outputted from the controller 15 is inputted to the data encoder 81 and this is encoded in accordance with the format of the Closed Caption Decoder (CCD). For example, this could be inserted at the vertical blanking synchronization within the twenty-first line of the first field within the composite video signal from the descramble circuit 12. The character generator 16, converter 17 and multiplexer 13 shown in FIG. 2 are omitted from this decoder 1. Other aspects of the decoder 1 are the same as that shown in FIG. 2.

Also, in addition to a tuner 50, a video processor 51 and a CRT 52, the television (TV) 2 in this embodiment is equipped with a CCD decoder 54 for receiving CCD information, a controller 55 and a character generator 56. There is also an infra-red sensor 57 for receiving the infra-red light projected by the remote controller 58 and outputting the detected signal to the controller 55.

Next, the operation of these items will be described. An instruction is given to receive a prescribed channel by operating the remote controller 58 for the TV 2 and an infra-red signal corresponding to this instruction is taken as input by the infra-red sensor 57. The controller 55 receives an input signal corresponding to this instruction via the infra-red sensor 57. The tuner 50 is then controlled in accordance with this input and the electromagnetic waves for a prescribed channel are received and demodulated. The tuner 50 receives the channel corresponding to the instruction from within the RF signal inputted via the input terminal 53 and this demodulation output is outputted to the video processor 51. The video processor 51 then processes the signal inputted by the tuner 50 which is then outputted to the CRT 52 and displayed.

On the other hand, the signal outputted from the tuner 50 is also inputted to the CCD decoder 54. The CCD decoder 54 then extracts the CCD information from the signal inputted by the tuner 50 (inputted at the twenty-first line of the first field of the video signal in the NTSC method) and controls the character generator 56 in accordance with this CCD information. The character generator 56 then outputs character display data to the video processor 51 in accordance with the control signal inputted from the CCD decoder 54. The display character data inputted by the character generator 56 is then processed by the video processor 51. For example, this may be converted to an NTSC format video signal (or PAL, SECAM, etc.). This is then superimposed with the video signal inputted by the tuner 50, outputted to the CRT 52 and displayed. In this way, a prescribed image and its corresponding characters may be displayed so that viewers who are hard of hearing can also enjoy television broadcasts.

Recently in America, functions are being added so that character information is outputted and displayed with video images in order that people who are hard of hearing may also enjoy television broadcasts and this has now become obligatory for televisions which are 13 inches or larger. TV receivers which are 13 inches or larger then extract, decode and display the closed caption information (character information) inserted in the vertical blanking period (21H) of the TV signal.

On the other hand, in order to enjoy a program on a scrambled cable television channel, the remote controller 42 for the decoder 1 is operated and the infra-red sensor 41 for the decoder 1 is instructed to receive the signal for this prescribed channel. The infra-red sensor 41 then outputs a detection signal corresponding to the signal from the remote controller 42 to the controller 15. The controller 15 controls the tuner 11 in accordance with this input, and demodulates and outputs the prescribed channel signal for the instruction from the RF signal inputted by the input terminal 10. The video signal or IF signal outputted by the tuner 11 is then sent to the descramble circuit 12 and the data extraction circuit 14

The data extraction circuit 14 extracts the key data necessary for descrambling from the inputted information and outputs it to the controller 15. The controller 15 then controls the descramble circuit 12 in accordance with this key data and descrambles the scrambled video signal inputted by the tuner 11. The signal descrambled by the descramble circuit 12 is sent to the output terminal 19 via the data encoder 81. This is then inputted to the input terminal 31 of the TV 2, which is connected to this output terminal 19 by the cord 21, after which it is sent to the video processor 51. The inputted signal is then processed at the video processor 51, outputted to the CRT 52 and displayed.

When the controller 15 is, for example, displaying the pay per view menu, a control signal for controlling the character generator 56 for the TV 2 is generated and sent to the data encoder 81. The data encoder 81 then encodes this control signal in accordance with the CCD format, puts it in with the video signal from the descramble circuit 12 and sends it from the output terminal 19 to the input terminal 31 via the cord 21.

The signal which is inputted to the input terminal 31 is also inputted to the CCD decoder 54. Then, in the same way as for when the signal was inputted by the tuner 50, data relating to the CCD information is extracted from the signal inputted via the input terminal 31. The character generator 56 is then controlled in accordance with this extracted data and display characters are generated. The display character data outputted from the character generator 56 is then outputted to the CRT 52 and displayed after having been inputted to the video processor 51 and processed.

When the TV 2 does not have a composite video input terminal 31, the signal modulated from the RF signal coming from the RF modulation circuit 18 is inputted to the tuner 50 via the output terminal 20, cord 22 and input terminal 32. Processing is then carried out in the same way as for when the signal to be inputted comes via the input terminal 53 and characters corresponding to a prescribed image are displayed on the CRT 52.

When, for example, control signals such as information relating to the aspect ratio, or time information etc. including the start time and end time of the program broadcast, is included in the transmission signal along with the video signal, audio signal and character signal (CCD), this is extracted by the data extraction circuit 14 and outputted to the controller 15. The controller 15 then sends these control signals to the encoder 81, where they are converted into CCD format signals and outputted to the CCD decoder 54. The CCD decoder 54 then decodes these signals and sends them to the controller 55.

The controller 55 controls the video processor in accordance with these control signals, controls the aspect ratio displayed by the CRT 52 and converts the time information for a built-in timer. Alternatively, in cases such as where the broadcast start time and end time for a program are changed, the changed time information is stored in a built-in memory. If, for example, the remote controller 58 is then operated so as to instruct the timer to record a prescribed program, this timer record information is compared with the data stored in the memory so that if the start time and end time of the program it is intended to record using the timer is different, the timer record start time and end time can be automatically changed to these modified times.

Also, in this embodiment, the channel which the tuner 50 for the TV 2 receives can be selected by operating the remote controller 58 for the TV 2. In addition to this, it is also possible to set the tuner 50 for the TV 2 to receive on a prescribed channel by operating the remote controller 42 for the decoder 1.

Namely, if, in this case, the tuner 50 for the TV 2 is instructed to select a prescribed channel, this selection signal is sent to the controller 15 via the infra-red sensor 41. The controller 15 then outputs a control signal corresponding to this input from the infra-red sensor 41 to the controller 55 via the encoder 81 and the CCD decoder 54. When the controller 55 receives this control signal input it controls the tuner 50 in the same way as when it receives instructions from the remote controller 58 via the infra-red sensor 57, and a prescribed channel is selected at the tuner 50.

As well as being possible to input instructions relating to each of the above operations by operating the remote controllers 42 and 58, it is also possible to input by operating the buttons and switches on the decoder 1 or the TV 2 directly.

According to the broadcast receiving apparatus for the present invention described above, a character generator is set up at the television receiver and this character generator is controlled from the decoder side. This means that it is no longer necessary to set up two character generators so that a low cost system is possible.

What is claimed is:

1. A television signal receiving apparatus for a television receiver capable of receiving a non-scrambled video signal and a related character signal inserted in a vertical blanking interval of the non-scrambled video signal comprising:

tuner means for receiving a television signal and generating the non-scrambled video signal;

decoding means for extracting and decoding the character signal from the non-scrambled video signal;

video processing means for processing a video signal;

character generating means for generating a character video signal in response to the decoded character signal;

controller means for controlling said tuner means, said character generating means and said video processing means;

input means for receiving an external video signal; and scrambled signal decoding means, for receiving and descrambling a scrambled video signal, equipped with encoding means for encoding the descrambled signal in such a manner as to be identical to the non-scrambled video signal, with the output from said encoding means being supplied to said input terminal means.

2. A television signal receiving apparatus according to claim 1, wherein said scrambled signal decoding means further includes data extracting means for extracting data for descrambling the scrambled signal.

3. A television signal receiving apparatus according to claim 1, wherein the television receiver and said scrambled signal decoder means are capable of being operated in accordance with remote control signals remotely transmitted.

4. A television signal receiving a non-scrambled apparatus comprising:

a television having;

a first tuner for receiving a television signal and generating a non-scrambled video signal;

a decoder, coupled to receive said non-scrambled video signal from said first tuner, for extracting and decoding a character signal from said non-scrambled video signal; a character generator, coupled to receive said non-scrambled video signal from said first tuner, for generating a character video signal responsive to said decoded character signals;

a video processor coupled to said first tuner and said character generator for processing said non-scrambled video signal and said character video signal, to generate a video image; and an input terminal for receiving an external video signal; and a decoder comprising;

a second tuner for receiving a scrambled television signal and generating a scrambled video signal;

a descramble circuit coupled to said tuner for generating a descrambled video signal based on said scrambled video signal;

an encoder, coupled to said descramble circuit, for generating, based on said descrambled video signal, an encoded video signal in a form so as to be operable upon by said video processor, decoder and character generator of said television in the same manner as said non-scrambled video signal and said character video signal, to generate a video image; and a terminal for coupling said encoded video signal from said decoder to said input terminal of said television.

5. A television signal receiving apparatus as set forth in claim 4 wherein said television further comprises a first controller for controlling said first tuner, said character generator and said video processor.

6. A television signal receiving apparatus as set forth in claim 5 wherein said decoder further comprises a second controller for controlling said second tuner, said descramble circuit and said encoder.

7. A television signal receiving apparatus as set forth in claim 6 wherein said decoder further comprises data extracting means for extracting data from said scrambled video signal for descramblimg the scrambled television signal.

8. A television signal receiving apparatus as set forth in claim 7 wherein said television and said decoder are capable of being operated by remote control.

* * * * *